(12) United States Patent
Thiel et al.

(10) Patent No.: US 8,090,418 B2
(45) Date of Patent: Jan. 3, 2012

(54) CONVERTIBLE HEADSET RING FOR WIRELESS COMMUNICATION

(76) Inventors: Joseph Adam Thiel, Interlochen, MI (US); Ryan David Wells, Traverse City, MI (US)

( * ) Notice: Subject to any disclaimer, the term of this patent is extended or adjusted under 35 U.S.C. 154(b) by 423 days.

(21) Appl. No.: 12/425,164

(22) Filed: Apr. 16, 2009

(65) Prior Publication Data
US 2010/0056233 A1    Mar. 4, 2010

Related U.S. Application Data

(60) Provisional application No. 61/092,706, filed on Aug. 28, 2008.

(51) Int. Cl.
*H04M 1/00* (2006.01)
(52) U.S. Cl. .................................. 455/575.2; 455/575.6
(58) Field of Classification Search ............... 455/575.2, 455/575.1, 575.6, 90.1, 90.3
See application file for complete search history.

(56) References Cited

U.S. PATENT DOCUMENTS

| | | | |
|---|---|---|---|
| 5,655,026 A | 8/1997 | Peters et al. | |
| 2004/0082360 A1 | 4/2004 | Gunter et al. | |
| 2004/0169638 A1* | 9/2004 | Kaplan | 345/156 |
| 2006/0166716 A1 | 7/2006 | Seshadri | |
| 2006/0194621 A1 | 8/2006 | Seshadri | |
| 2007/0080934 A1* | 4/2007 | Chen et al. | 345/156 |
| 2009/0007596 A1* | 1/2009 | Goldstein et al. | 63/1.11 |
| 2009/0154719 A1* | 6/2009 | Wulff et al. | 381/74 |
| 2009/0181731 A1* | 7/2009 | Seshadri et al. | 455/575.2 |

FOREIGN PATENT DOCUMENTS

| KR | 20-0317574 Y1 | 6/2003 |
|---|---|---|
| KR | 10-0851943 B1 | 8/2008 |

OTHER PUBLICATIONS

Finger Fone finger-mounted Bluetooth headset; posted by Evan Blass; internet article; Oct. 4, 2005; 1 page.*
CNET, Bluetooth headsets, on-line article, date unknown, 4 pages, www.ecoustics-cnet.com.com, U.S. (internet publication).

* cited by examiner

*Primary Examiner* — Peguy Jean Pierre
(74) *Attorney, Agent, or Firm* — Traverse Legal, PLC (57) ABSTRACT

An over-the-ear Bluetooth® type communications headset for hands-free communication with mobile phones and similar devices, the headset being convertible to a ring configuration for wearing on the finger as a communications device and as jewelry. The headset is divided into ear-piece and voice-piece halves that swivel between headset and ring modes, with respective S- and circular shapes, and includes function-changing contacts that respond to the realignment of the halves in the respective headset and ring modes to optimize the device's use for over-the-ear or finger wear. A further feature is a set of interior spring contacts projecting from the inner circumference of one of the halves, the contacts having both electrical recharging and finger-fitting functions, and a finger-shaped charging base for recharging the headset in the ring configuration via the spring contacts.

21 Claims, 13 Drawing Sheets

CONVERTIBLE HEADSET RING FOR WIRELESS COMMUNICATION

CROSS-REFERENCE TO RELATED APPLICATIONS

This application claims the benefit of U.S. provisional patent application No. 61/092,706 filed Aug. 28, 2008 by the same inventors (Thiel and Wells), and incorporates the entirety of that provisional application by reference.

BACKGROUND OF THE INVENTION

1. Field of the Invention

The invention relates to wireless mobile phone "headsets" worn as earpieces, exemplified by over-the-ear headsets using the well-known Bluetooth® wireless protocol.

2. Description of Related Art

Wireless mobile phone headsets have become common. These headsets typically use the Bluetooth™ short-range wireless communication protocol. The typical "headset" is actually a device worn on the user's ear to provide hands-free communication and control between the user and a nearby mobile device such as a phone. Other Bluetooth-type communication uses include, but are not limited to, wireless networking between PCs; wireless communication with PC input and output devices; transfers of files, contact details, calendar appointments, and reminders between devices using OBEX (OBject EXchange) communication protocol; replacement of traditional wired serial communications between devices; as a substitute for infrared control over devices; sending small advertisements between Bluetooth-enabled devices; in wireless video game controllers; and for converting mobile phones to modem use. While Bluetooth-type headsets are primarily used in conjunction with mobile phones, it is possible to use such headsets in conjunction with these other devices.

Among headset styles, the over-the-ear mount type is perhaps most common. For example, in a CNET review of Bluetooth headsets, roughly 180 different models were listed as "over-the-ear" versus a relative handful of each of ten other styles.

SUMMARY OF THE INVENTION

According to the invention, an over-the-ear Bluetooth-type headset device can be mechanically reconfigured between a headset mode worn over the ear and a ring mode worn on the finger (or thumb). The headset device is generally circular in the ring mode and generally S-shaped in the headset mode, with two parts (hereafter "halves", although not necessarily equal or identical) that swivel or rotate or are otherwise connected to move relative to one another between the two configurations.

According to another feature of the invention, the movable connection between the halves, for example a hinge joint, includes mode-detecting and -enabling contacts (hereafter "mode contacts") that respond to the mechanical reconfiguration of the headset device halves to change the headset device's mode of operation. When the headset device is in headset mode, the mode contacts on one half mate with those on the other half to enable headset functions; when the headset device is in ring mode, the mating of the mode contacts is changed or reversed to enable ring functions.

According to another feature of the invention, the configuration of the headset device in headset mode is designed for a unique and novel fit over the human ear According to another feature of the invention, the headset device includes one or more yielding, compression- or sprung-type contacts protruding from the inside curved surface of at least one of the two halves. The contacts function as both charging contacts and as an automatic finger-sizing adjustment mechanism. In a preferred form, a finger-shaped charging base receives the headset device in ring mode to recharge the device through the contacts on the inside curved surface.

These and other features and advantages of the invention will become apparent from the detailed description below, in light of the accompanying drawings.

DESCRIPTION OF THE PREFERRED EMBODIMENT

Figure 1:
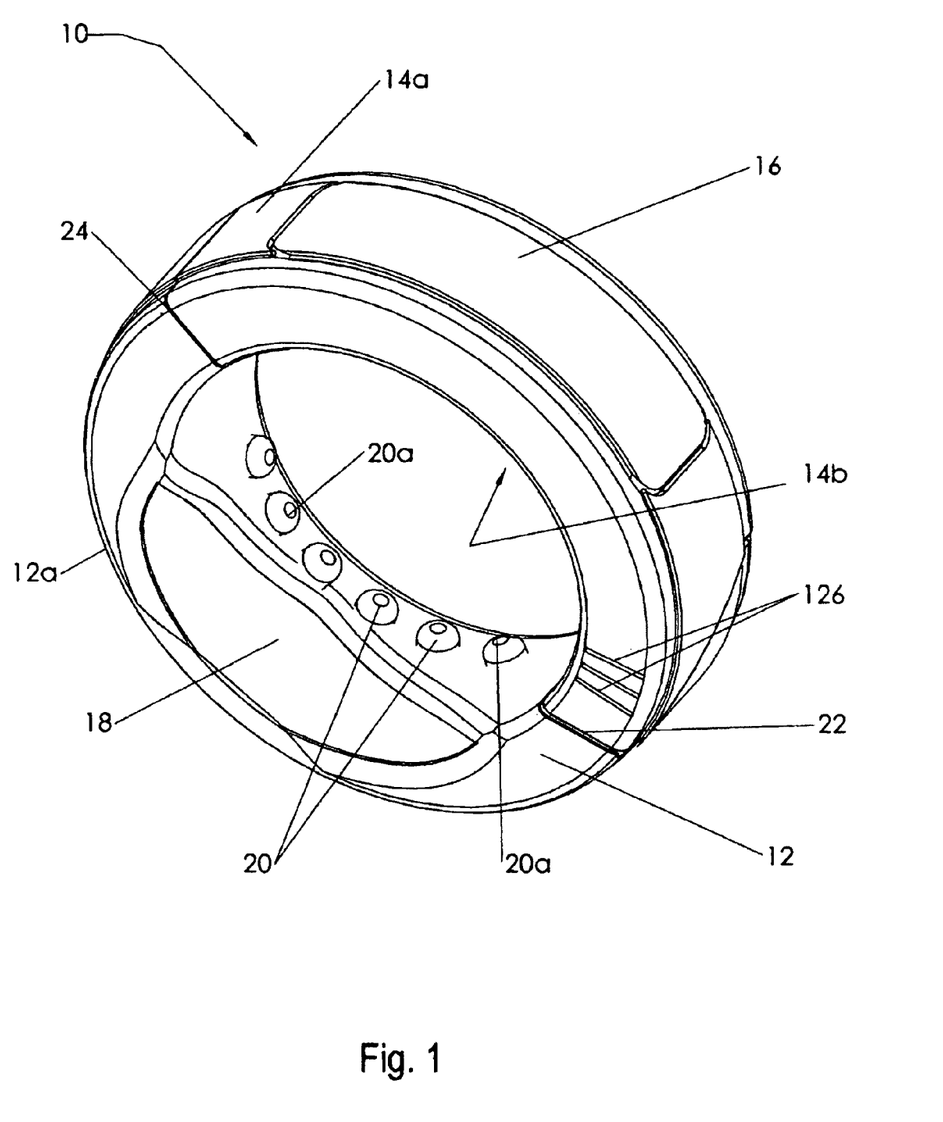
FIGS. 1 and 1A are perspective views, from different angles, of a headset device according to the invention, in ring mode for wearing on a finger or thumb.
Figure 1A:
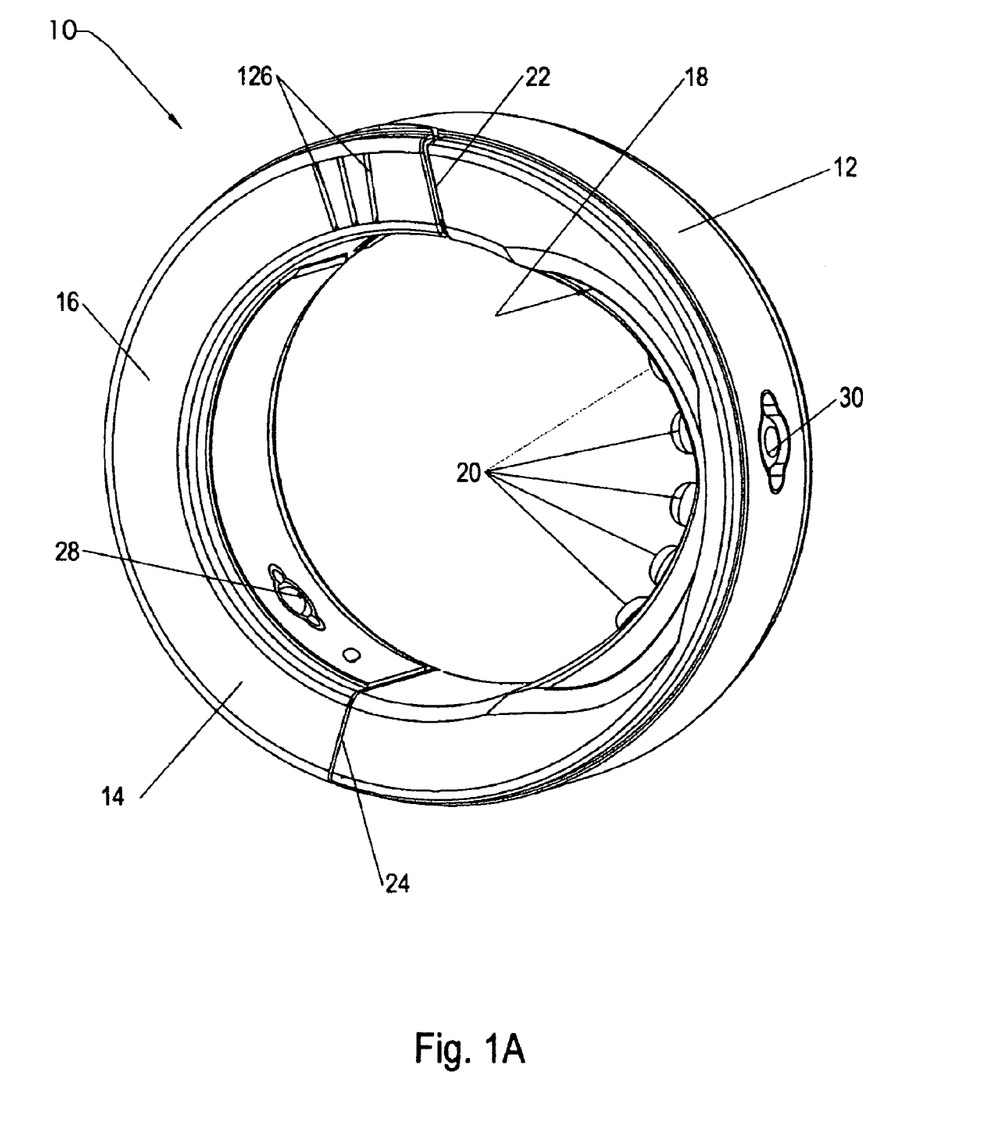

FIGS. 1 and 1A show a headset device 10 according to the present invention, from two different angles, configured in its ring mode for wearing on a finger or thumb. Headset 10 has two main movable parts (which will sometimes be referred to as "halves" for convenience): an ear-piece 12 and a voice-piece 14, with respective receiving and transmitting functions via a wireless link to a nearby communications device of known type, for example a mobile phone. In this illustrated embodiment it will be assumed that the currently popular and well-known Bluetooth® short range wireless communications protocol is used, although other forms of wireless communication are believed to be known and suitable or adaptable for use with headset 10. These wireless communications protocols and techniques, and the internal circuitry and other technology that enables their use in wireless headsets, are known to those skilled in the art, are already widely used in over-the-ear and other types of headset, and their further description is unnecessary for an understanding of the present invention, which resides in the mechanical configuration and operation of headset 10 as a structural vehicle for the use of such known wireless communications.

Ear-piece 12 includes a sound-transmitting portion 18, which in the illustrated embodiment includes a functionally conventional sound-emitting device (SED) built into the ear-piece, preferably internally with a suitable outer covering such as a soft molded polymer surface or membrane. Ear-piece 12 also includes one or more interior contacts 20 protruding from the inner circumference or surface 12b of ear-piece 12, as space permits adjacent SED 18. SED 18 is located toward the outer edge of the ring's inner curved surface 13, and angled away from the center of the ring, defining in effect an outwardly-beveled surface.

Figure 7:
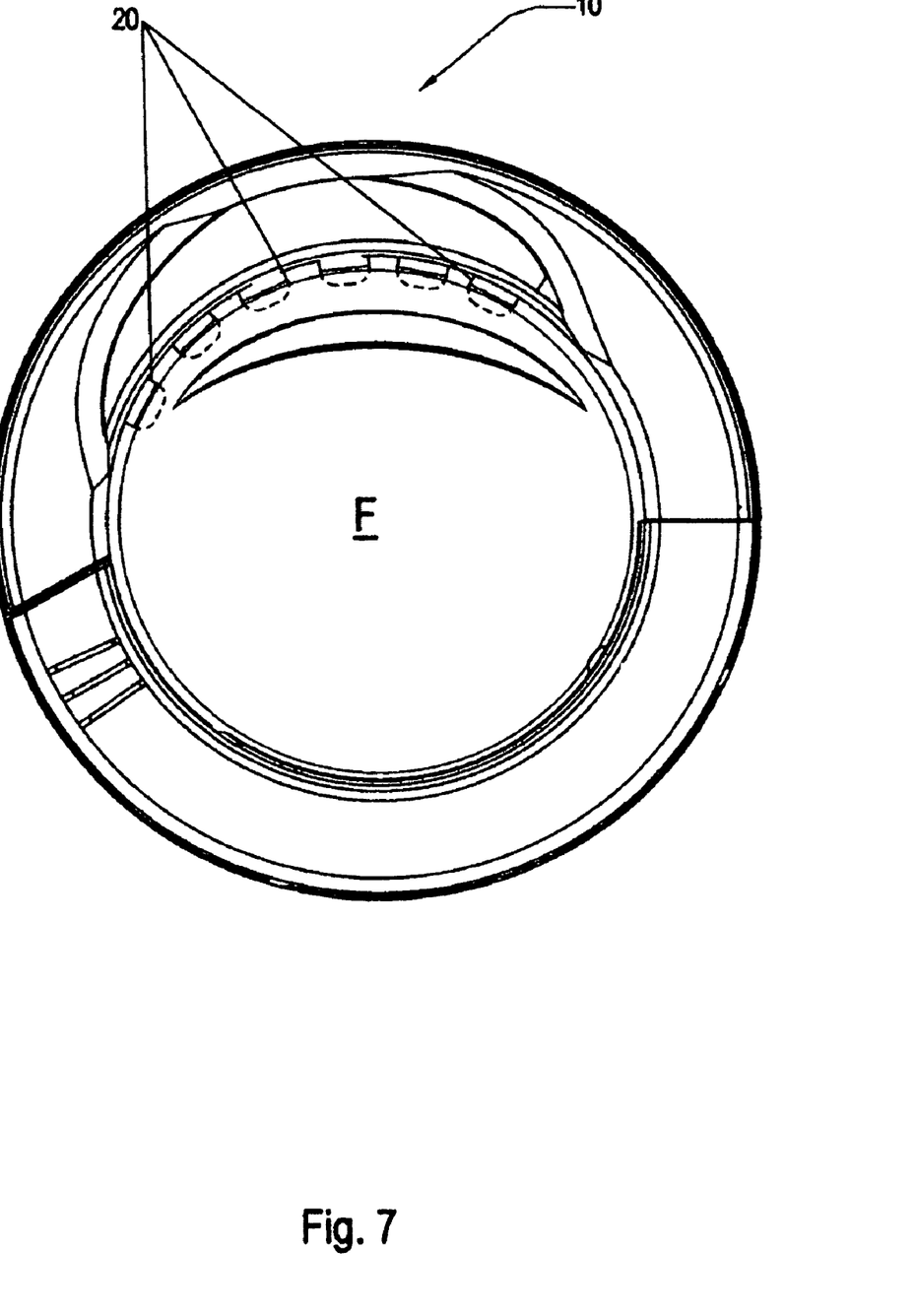
FIG. 7 is an axial front view of the headset device of FIG. 1 in ring mode, with a finger inserted in the ring and the sizing contacts compressed in response for a good fit.

In the illustrated embodiment the contacts 20 are arranged in a circumferential row so that they evenly contact the finger or thumb (hereafter "finger") of a person who is wearing headset 10 in its ring configuration (best shown in FIG. 7). Contacts 20 preferably serve both battery-charging and finger-fitting functions, described in further detail below, and have a surface finish and shape designed to be comfortable against a finger. Illustrated contacts 20 have a preferred smooth, rounded, hemispherical shape, with at least a portion of each contact having an electrical contact surface, for example at apex 20a, capable of transmitting an electrical charging current to a battery in headset 10. Contacts 20 are also preferably mounted with a positive pressure-type bias, normally being extended to their maximum height above the inner surface of the ring, but yielding or being compressed inwardly when a finger is inserted into the ring.

Voice-piece 14 includes an LCD or LED or equivalent display 16 on its outer curved surface 14a, for displaying dialed numbers, received numbers, caller I.D., information recalled from the headset's memory, text messages, and other alphanumeric or visual display information of the type commonly used with wireless headsets and mobile phones. Illustrated display 16 is preferably made from a flexible plastic OLED (organic LED) type screen material, which is currently believed to be the easiest to form into the shape of the relatively tightly-radiused outer surface curvature of voice-piece 14. Other display materials and types are believed to be suitable as well, although depending on the type they might not conform perfectly or even closely to the outer surface curvature of the portion of headset 10 into which they are built, but could instead be inset or offset from the curved surface. Display 16 is preferably a touch-screen of known type, with information sent and retrieved by direct touch applied to the screen, for example with the tip of a pen or small stylus, although separate display controls could be located elsewhere on headset 10.

Figure 2:
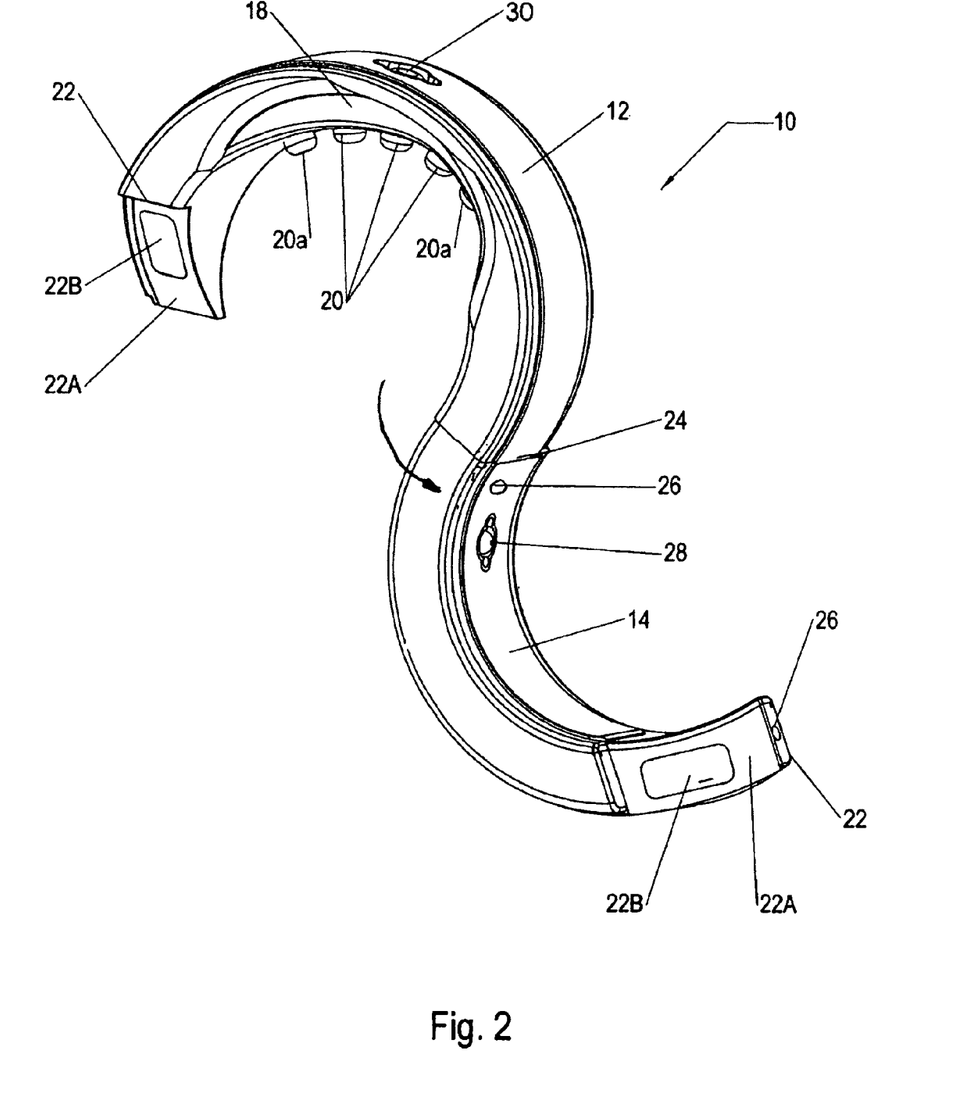
FIG. 2 is a perspective view of the headset device of FIG. 1, in headset mode for wearing over the ear, with the movement of the headset device halves between the two modes shown in phantom lines.

The headset 10 in FIGS. 1 and 1A shows a preferred set of controls, including: an exterior button 30 on ear-piece 12, used for example to silence a ring or a vibratory alert and/or to answer a call or activate a speaker-phone function; an interior button 28 on voice-piece 14, used for example to control volume; and a voice receiver 126 on a side face of voice-piece 14, illustrated in a preferred example as multiple slots through the surface of the voice-piece 14 to permit clear sound transmission to a conventional internal receiver. FIG. 2 illustrates a set of additional voice receivers 26 formed in the clasp end 22 and on the inner surface 14a of voice-piece 14, enabled in the headset mode, with the preferred example being a spaced DSP dual-mike array of the type commercially available from Step Labs for use with Bluetooth® headsets.

It will be understood that the control and display features shown in the illustrated example herein reflect a currently preferred set and arrangement of features for headset 10, but that their number, type, and placement can vary depending on the desired functions in headset device 10.

Figure 2A:
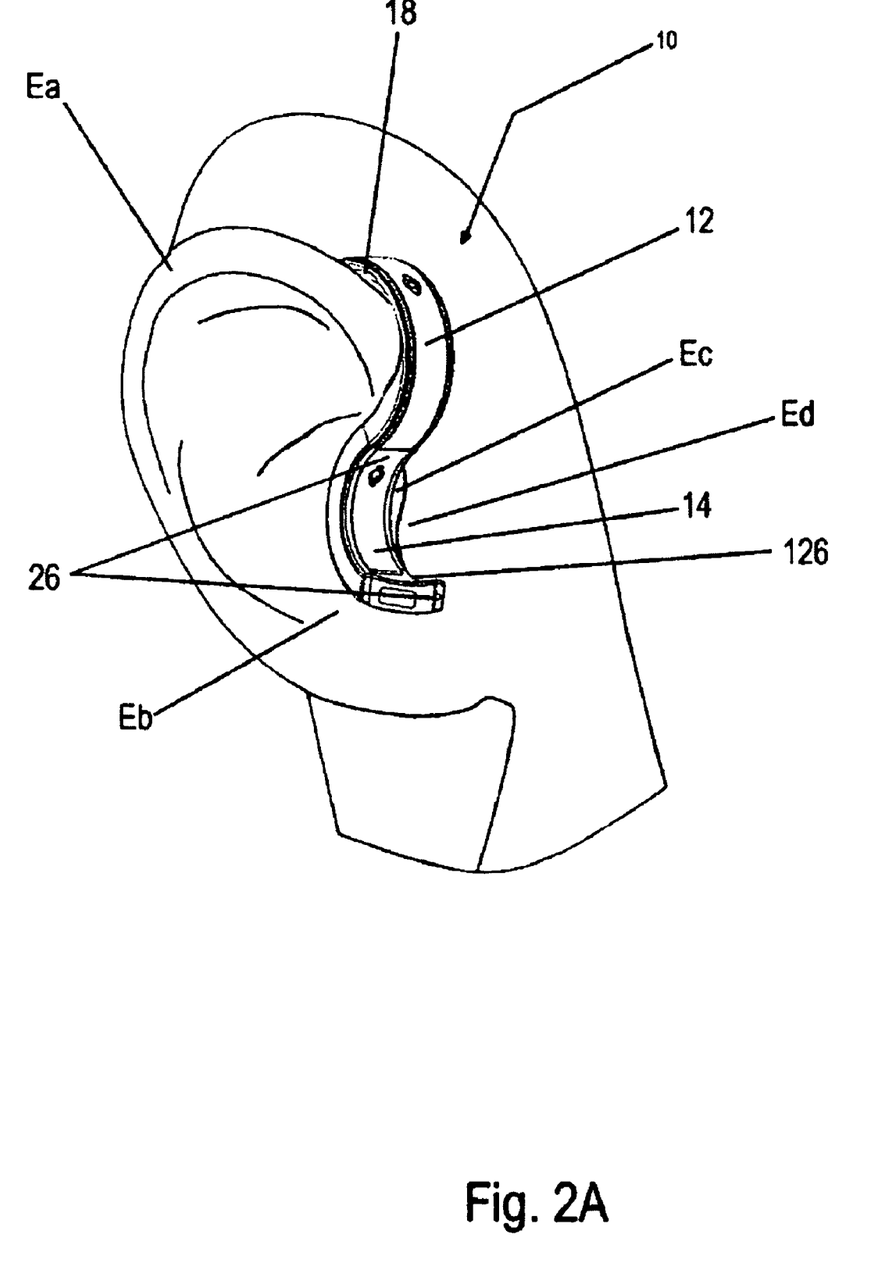
FIG. 2A is a perspective view of the headset device of FIG. 2 worn on an ear.

Referring now to FIG. 1 through FIG. 2A, the ear-piece and voice-piece halves 12, 14 of headset 10 are connected to one another in the ring configuration at a releasable joint 22 and at a movably-connected joint 24, such that the headset halves 12 and 14 can be swiveled or rotated from the circular ring configuration shown in FIGS. 1 and 1A to the generally S-shaped, over-the-ear headset configuration shown in FIGS. 2 and 2A. Releasable or "clasp" joint 22 can take different forms, but in the illustrated embodiment the joint is made by a pair of mating, complementary angled faces 22a on the free ends of ear-piece 12 and voice-piece 14, fitting together in the ring configuration and held in place by additional clasp means or by a bias or force exerted by joint 24. In the illustrated embodiment, the clasp means at joint 22 are mating magnet inserts 22b secured in faces 22a. The magnets hold the ends 22 securely together when the headset is worn as a ring, but allow the ends to be easily separated using a combination of sliding and rotational movement of halves 12 and 14 about joint 24 when changing the headset to an over-the-ear configuration. Other known types of clasp means could be used at 22b, including mechanical connectors or small hook-and-loop patches.

Movably-connected joint 24 can take different forms, but in the illustrated embodiment joint 24 is a preferred swivel or hinge joint allowing both a pulling-apart motion to initiate the reconfiguration of the halves 12 and 14 from one mode to another, followed by a rotating motion on an axis through their mating ends at joint 24. Other types of joint structure could be use to movably connect the headset halves at 24, including but not limited to planar (ring halves in same plane) and non-planar (ring halves in different planes) shear connections, simple rotational swivel connections, and flexible twist connections. It would be possible, although less desirable, to make the headset halves 12 and 14 releasable at joint 24, so that they could be pulled completely apart and reassembled in the desired configuration.

The over-the-ear headset configuration of FIG. 2 is designed specifically to fit over the human ear E (FIG. 2A) in a manner that holds headset 10 securely in place on the ear, that places angled SED surface 18 in line to project sound directly to the ear canal Ec or other ear surfaces that channel sound into the ear, and that aligns voice receiver openings 26 and 126 with the user's mouth and/or places the voice receiver against the jawbone for sound conduction or other methods of conduction. It also leaves control buttons 28 and 30 accessible for finger activation, as needed. In the illustration of FIG. 2A, the preferred fit is illustrated with the ear-piece half 12 resting between the helix Ea and side of the head. The movable joint 24 rests just over the external auditory meatus between (below) the helix Ea and (above) the tragus Ed. The voice-piece half 14 surrounds the tragus Ed with the lower portion of the voice-piece resting just outside the ear on the top of the jawbone under the tragus Ed and above the antitragus Eb.

Figure 3A:
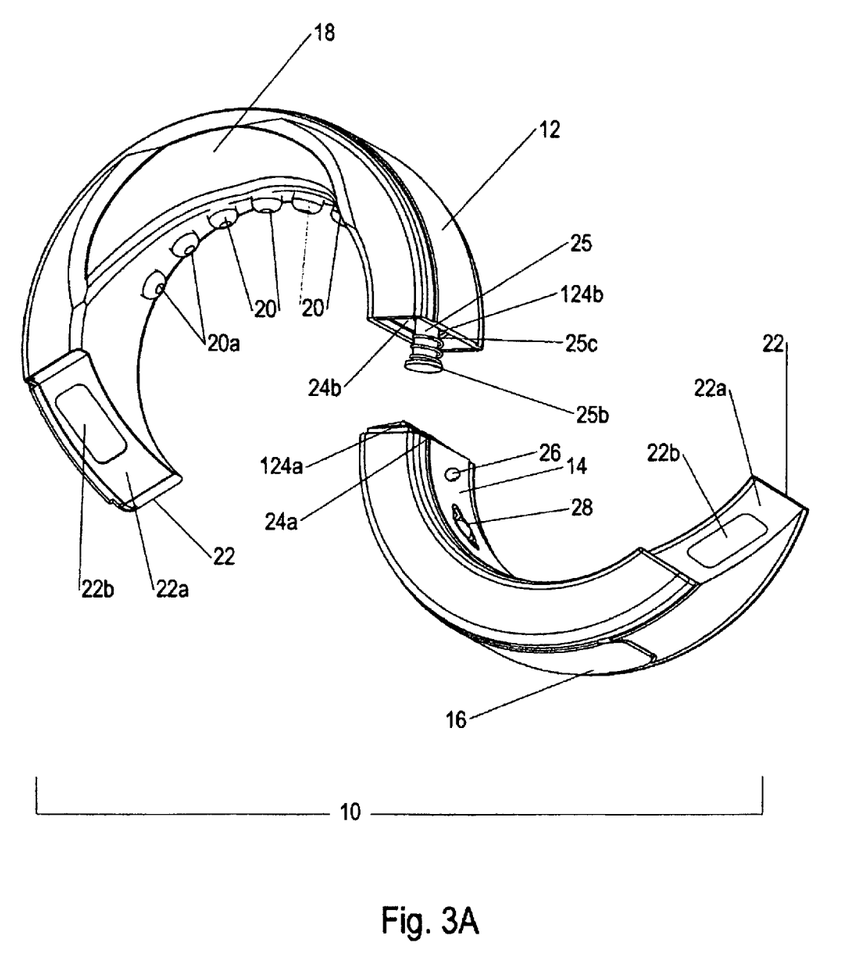
FIGS. 3A and 3B are exploded perspective views of the halves of the headset device, looking at the inner face of the ear-piece half of the device.
Figure 3B:
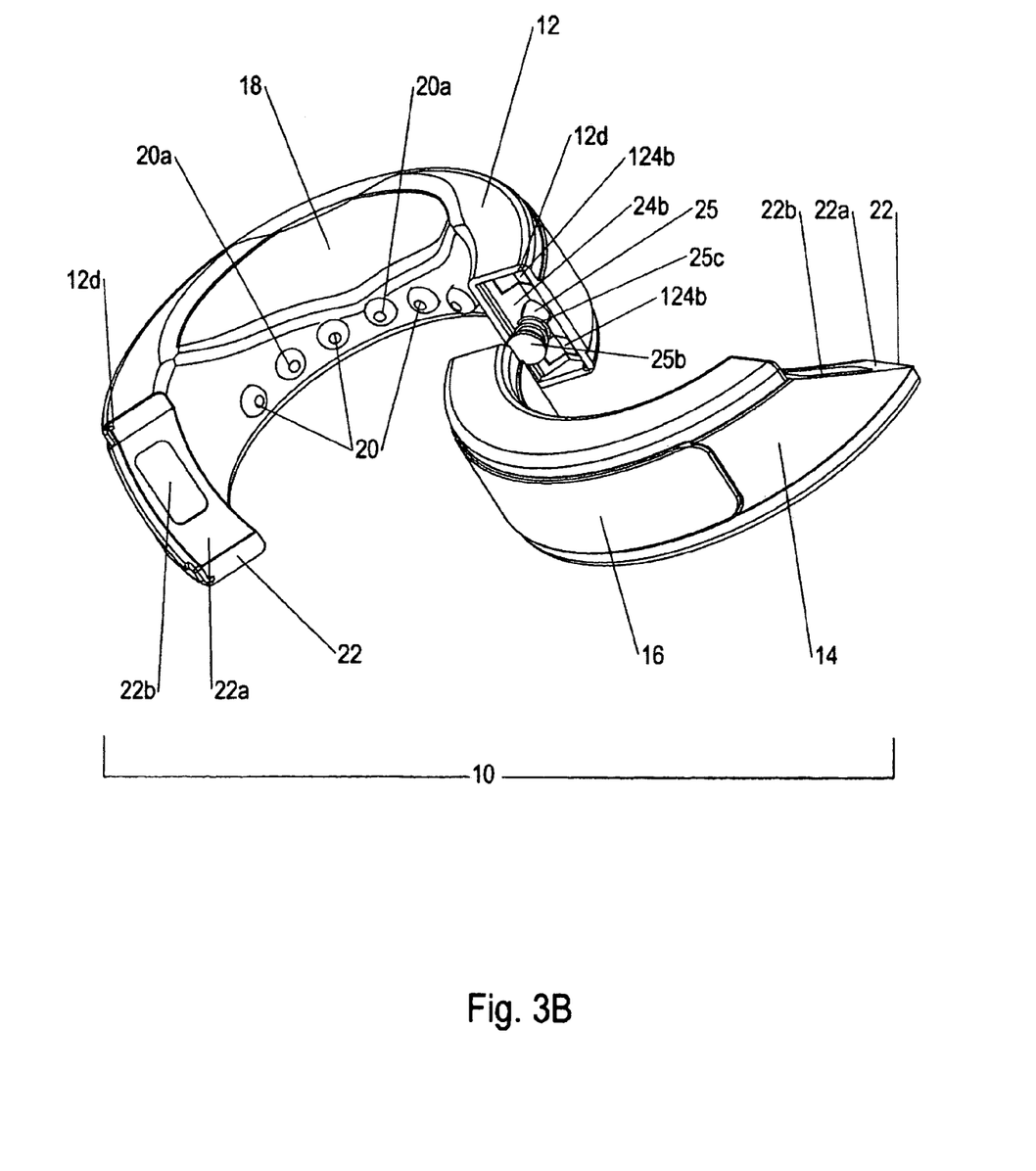
Figure 4:
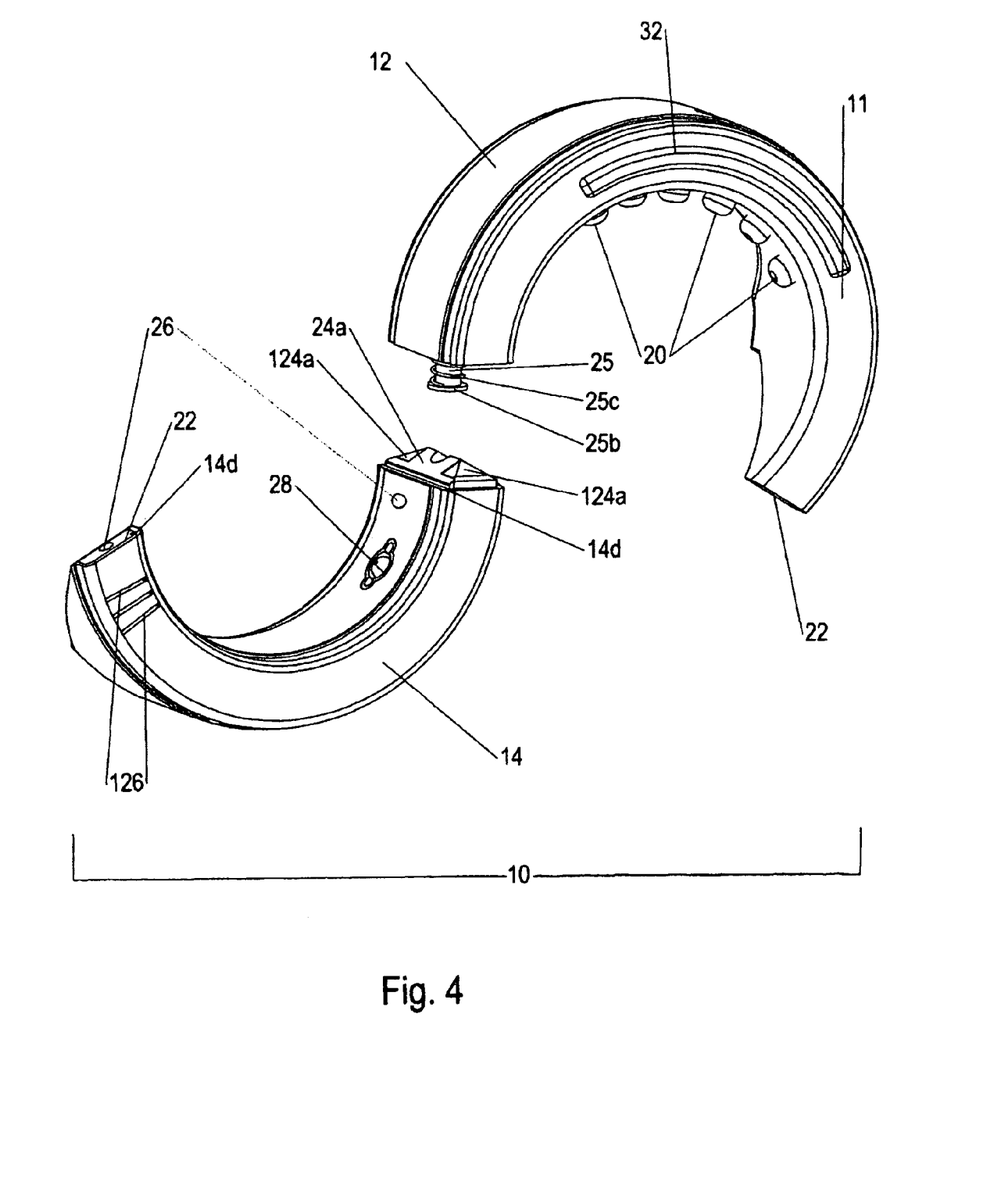
FIG. 4 is an exploded perspective view of the headset device, similar to FIG. 3B, but looking at the inner face of the voice-piece half of the headset device.

FIGS. 3A, 3B and 4 best illustrate the details of a preferred swivel joint 24 that joins the two headset halves 12 and 14 in a manner allowing the halves to be reconfigured between the ring and headset modes. It will be understood that the illustrated joint 24 is a currently preferred arrangement, but is not intended to limit the invention to this particular joint structure. Joint 24 includes mating "pyramidal" joint faces 24a (male) and 24b (female), complementary mode changing electrical contacts 124a (male) and 124b (female), and a swivel or "ring snap" post 25. Joint faces 24a and 24b and mode contacts 124a and 124b mate axially in male/female fashion when they are aligned with one another in either the ring mode or the headset mode, preventing rotation of the halves relative to one another. Swivel post 25 has an elongated stem with a length equal to or greater than the distance needed to axially separate the opposing joint faces and contacts 24a-24b and 124a-124b. The post is rotatably anchored at each end in halves 12 and 14 at enlarged ends 25a and 25b, and a compression spring 25c on the post is compressed to place the halves 12 and 14 in tension when they are pulled apart on the axis of post 25. The height of post 25 thus allows the mating faces 24 to be pulled axially apart, separating the mating joint faces and mode contacts so that the headset halves 12 and 14 can be rotated on post 25 and re-aligned between the ring and headset configurations of FIGS. 1 and 2. The compression of spring 25c when the halves 12 and 14 are separated causes the re-aligned halves to snap together axially when released, re-establishing a secure, non-rotating connection between the halves in both the ring and headset modes. It will be understood that the return force tending to keep and return halves 12 and 14 together could be achieved with other forms of compression or tension member, including but not limited to an active rubber membrane.

FIGS. 3A, 3B and 4 show headset halves 12 and 14 exploded apart in positions corresponding to the headset mode, to illustrate the alignment of the mode contacts 124a and 124b that enables headset functions. In normal use, halves 12 and 14 would remain connected by post 25; the exploded views of FIGS. 3A, 3B, and 4 are for a better view of the mating hinge and contact features in the two different headset configurations. It will be understood that reversing the mating positions of the mode contacts 24a-24b and 124a-124b as described above can be sensed by the headset circuitry and used to enable two different sets of functions that best correspond to the headset and ring modes of operation.

Figure 5:
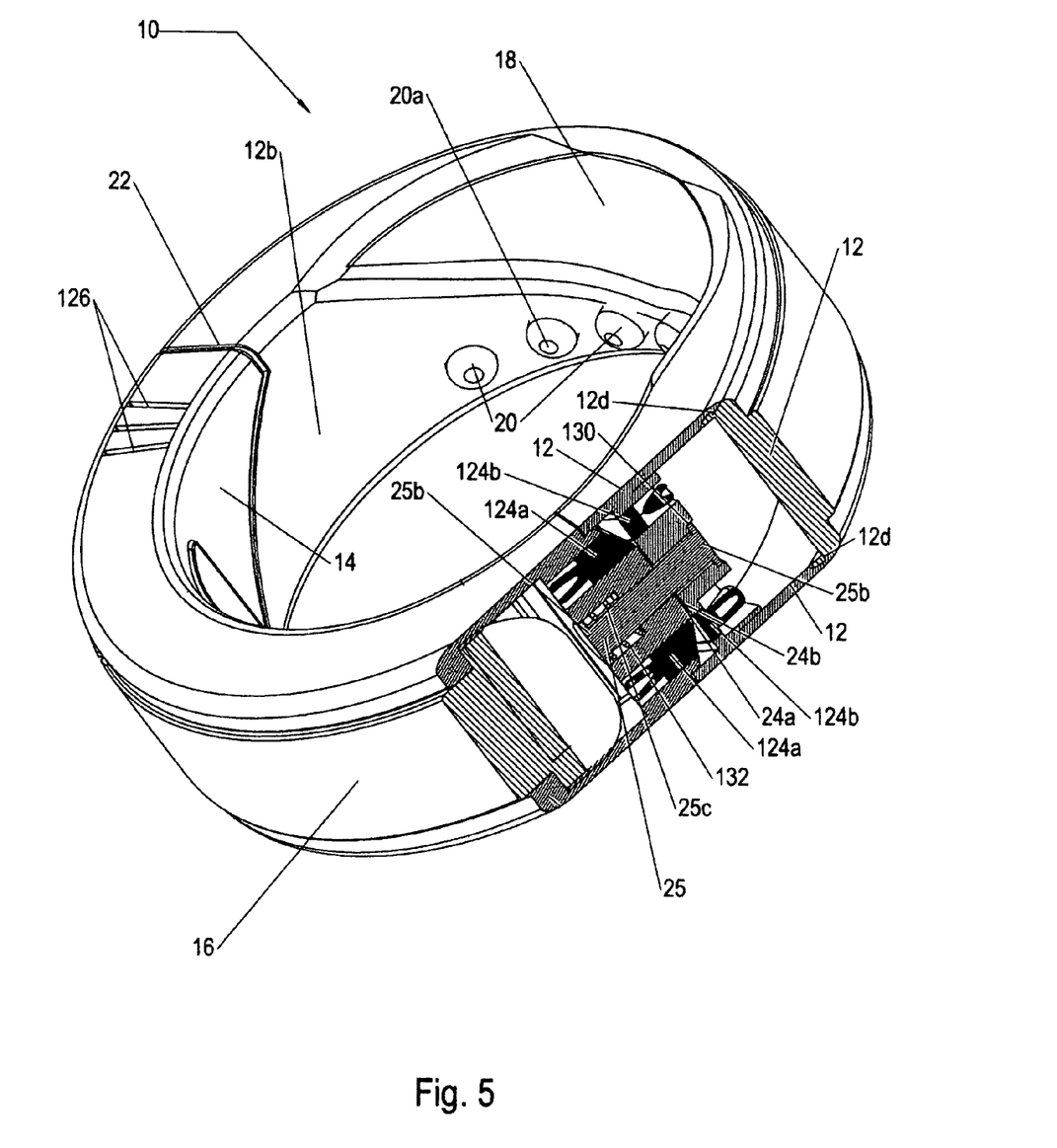
FIG. 5 is a detailed perspective view of the hinge area at the junction of the headset device halves in ring mode, with the junction of the mating halves partially cut away to show the mode contacts aligned in a ring-enabling orientation.
Figure 6:
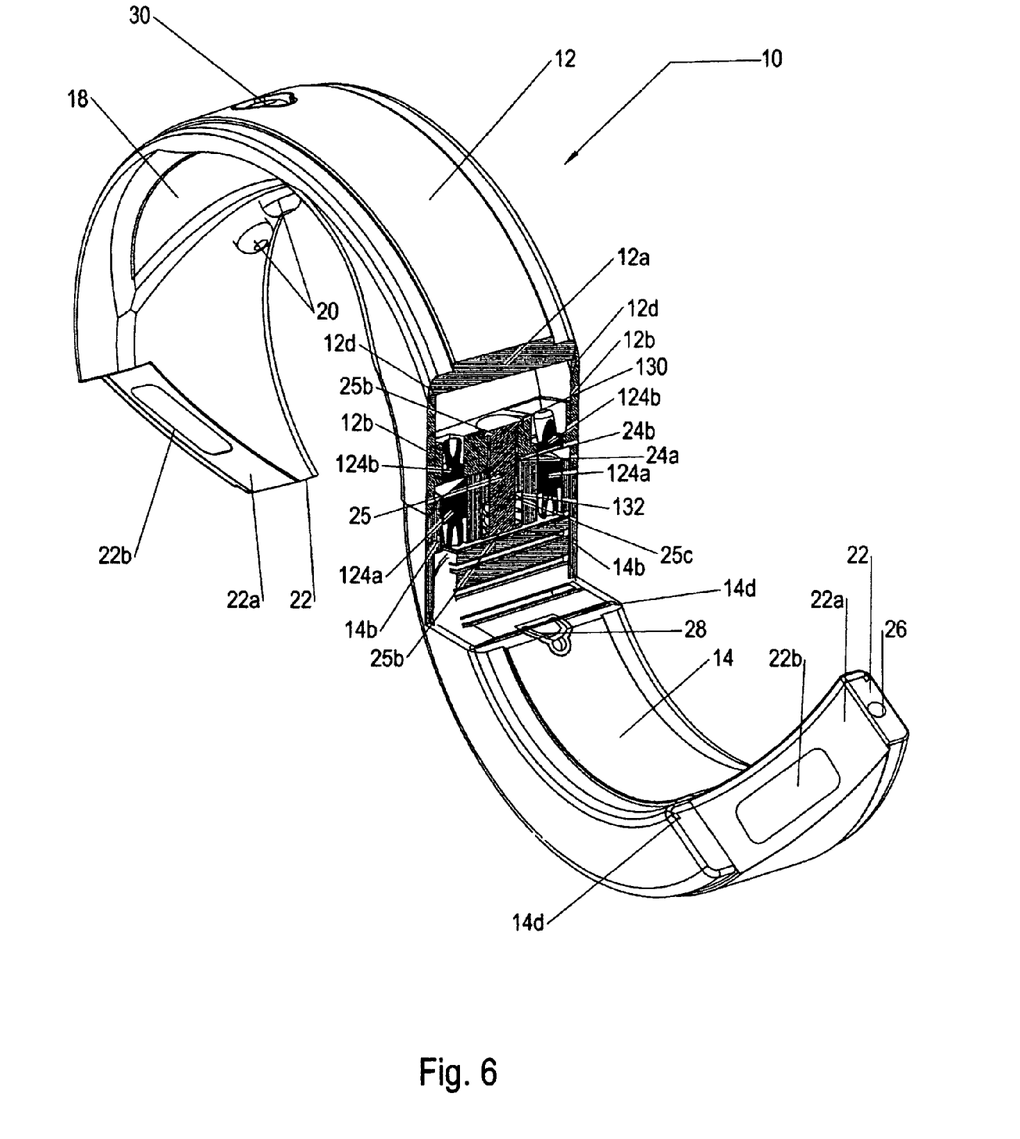
FIG. 6 is a detailed perspective view of the hinge area at the junction of the headset device halves in headset mode, partially cut away to show the mode contacts aligned in a headset-enabling orientation.

FIGS. 5 and 6 show the headset halves in the ring configuration, partially cut away to show the alignment of the mode contacts 124a and 124b in the ring mode, and further to show the connection between the post ends 25b with an anchor block 130 and a compression bushing 132 in halves 12 and 14, respectively. A "snap ring" end 25b of the post is anchored in a mating circular groove in block 130 in earpiece 12, while the other end 25b of the post is slidably mounted with spring 25c in bushing 132 in voice-piece 14.

FIG. 7 illustrates headset device 10 in ring mode, with a finger F inserted to compress contacts 20 inwardly (solid lines) from their normal extended position (phantom lines) for a snug fit. The compressive or yielding nature of contacts 20 allows a single headset device 10 to fit a wider variety of fingers. The compression bias of contacts 20, tending to hold them projected outwardly from the inner circumference of the ring, can be achieved in different ways, but in the illustrated embodiment can use button contacts seated on battery flex prongs connected to a battery inside the housing, similar to the flex prongs used in cell phones.

While the compressive yielding bias of contacts 20 is preferred, the contacts do not need to be biased to move or yield but could alternately be fixed in place.

Figure 8:
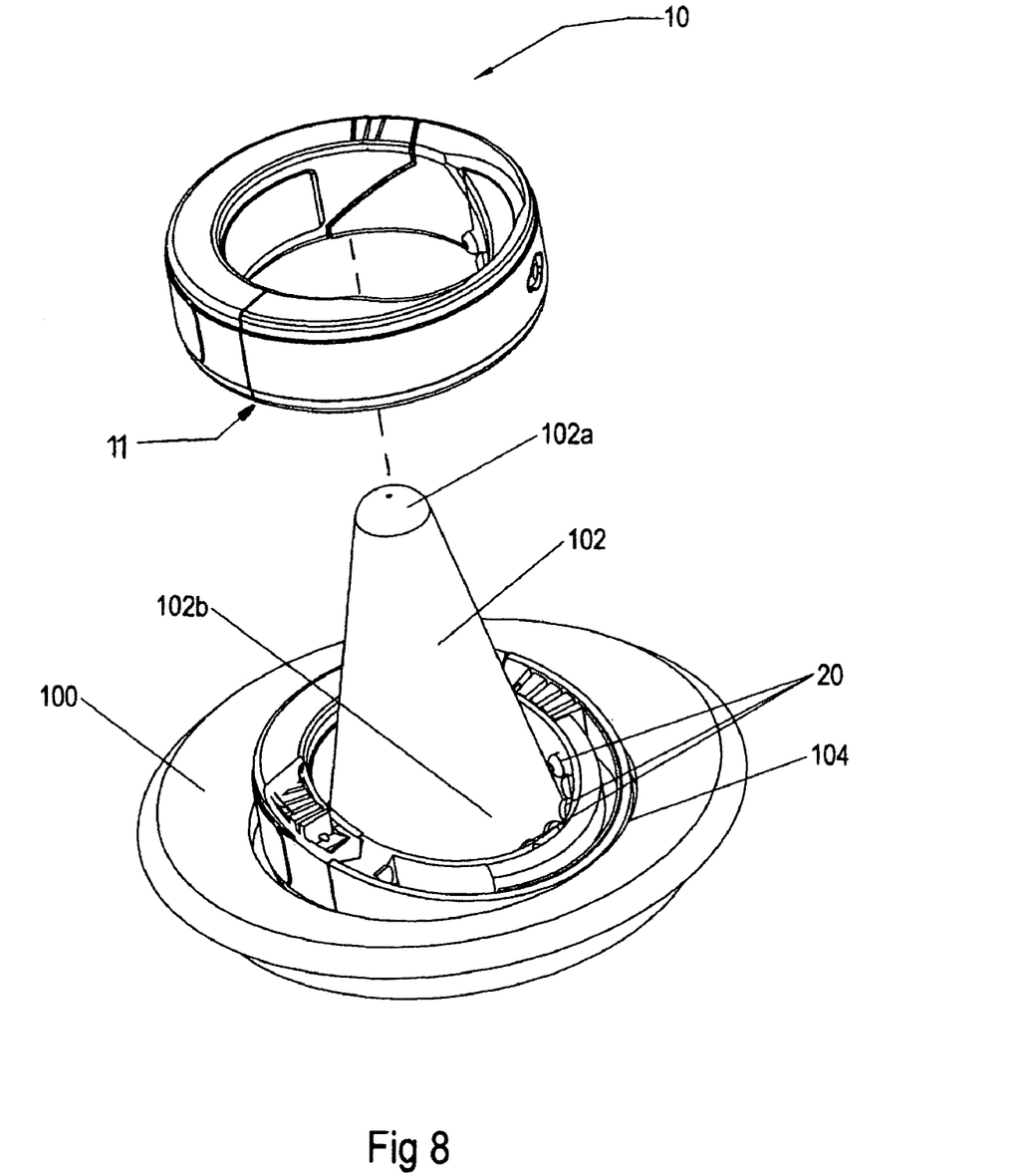
FIG. 8 is a perspective view of the headset device of FIG. 1 in ring mode, being mated to an upright charging base similar to a finger.

While FIG. 7 shows the finger-fitting function of contacts 20, FIG. 8 illustrates their charging function. A preferred charging unit or base 100 includes a generally finger-shaped charging post 102, tapering from a narrower conical tip 102a to a wider conical base 102b, adjacent a ring-shaped charging face or channel 104 surrounding, and electrically isolated from, post 102. Post 102 and channel 104 are opposite polarity charging contacts or electrodes supplied with electrical charging current from a suitable internal or external source. The length and taper of post 102 is chosen to receive headset device 10 in its ring configuration, progressively compressing contacts 20 as the ring is pushed down toward the bottom of the post until the side face 11 of the ring is against charging channel 104. Side face 11 has a charging contact 32 (best shown in FIG. 4) that makes electrical contact with channel 104, and the compression of contacts 20 against post 102 helps hold all of the charging surfaces on base 100 and headset device 10 securely in place for the charging cycle. Once headset 10 is seated on base 100, with post 102 electrically coupled to contacts 20 and channel 104 electrically coupled to contact 32, the charging circuit is complete and electrical current flows from base 100 to the rechargeable battery or batteries in headset 10. While side contact 32 is shown in FIG. 4 as a single elongated contact, it could also comprise multiple contacts. Contact 32 could also be located on an outer face of headset 10, with a corresponding charging channel or contact formed on base 100; or, the inner circumference of the ring and contacts 20 and charging post 102 could be sized and shaped for a keyed fit such that certain contacts 20 electrically engage first charging portions of post 102 while other contacts 20 electrically engage second, opposite-polarity charging portions of post 102 in order to complete the charging circuit.

Recharging base 100 can be powered in different ways, for example with a plug connection (not shown) to an external AC current source that known converter circuitry in the base converts to a suitable DC charging current for headset 10. Base 100 could also have its own disposable or rechargeable internal battery pack with sufficient storage to recharge headset 10 one or more times at remote locations.

Figure 9:
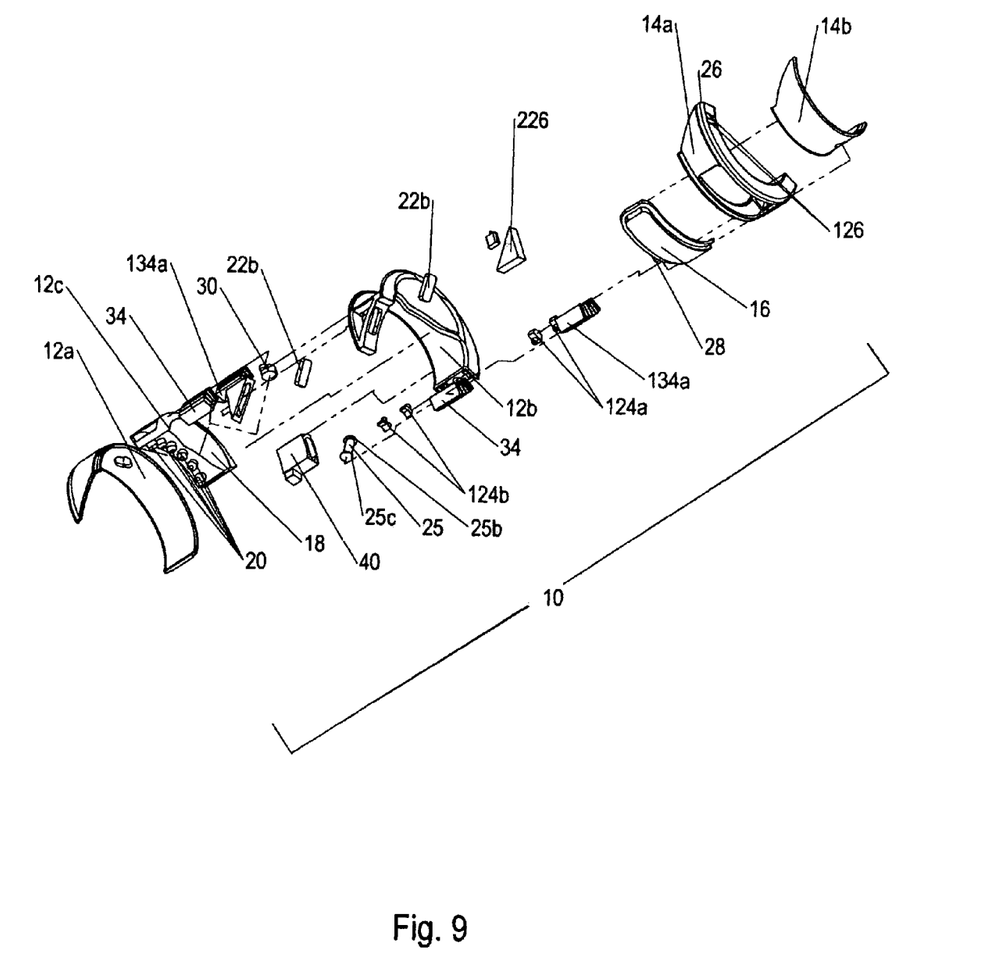
FIG. 9 is an exploded assembly view of the main components of the headset device of FIG. 1.
Figure 10:
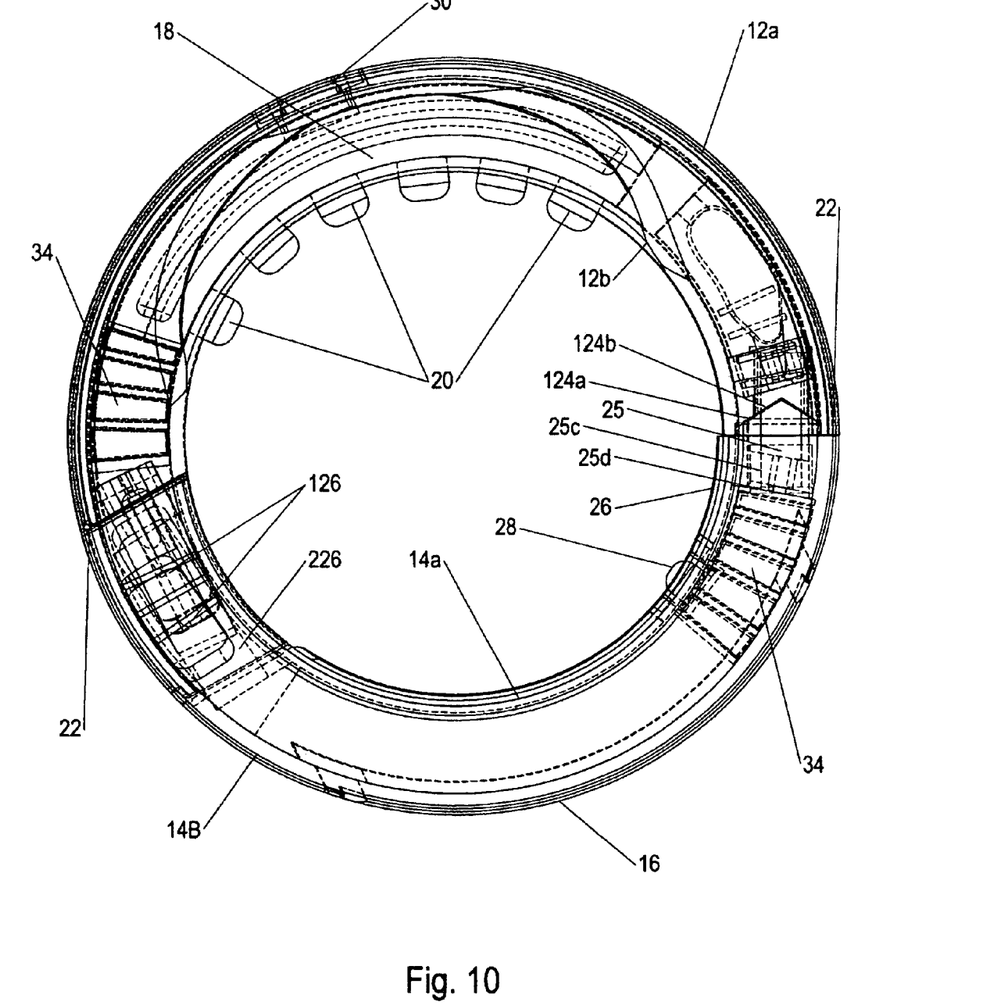
FIG. 10 is an assembly front view of the headset device of FIG. 1 in ring mode, with interior assembled components shown in hidden lines.

FIGS. 9 and 10 illustrate the above-described components of headset 10 in both exploded and assembled conditions, and some additional internal components not visible in the above views. Ear-piece 12 and voice-piece 14 are shown with a preferred clamshell type assembly, each having an "upper" housing 12a, 14a and "lower" housing 12b, 14b corresponding to the outer and inner circumferential surface of the ear-piece and voice-piece. The illustrated housings are preferably molded from a polymer material, but it would be possible to form them using other materials and methods. The upper or outer housing portions 12a, 14a, which are most visible in the headset's ring configuration, could for example be formed from ornate or precious metals for decoration as jewelry, and in the preferred form the upper housings can be snapped on and off the headset in order to be customized. For this purpose the illustrated upper housings 12a and 14a are shown with snap fittings 12d and 14d (see FIGS. 3B, 4, 5 and 6) for removable attachment to the lower housings 12b and 14b.

Other internal components best shown in FIGS. 9 and 10 include one or more integrated chipsets 34 for containing the amplifying and other circuitry needed for operation; a bone conduction receiving module 40 for transmitting voice communications in headset mode from the user's jawbone, instead of or in addition to the receiver voice slots 26 and 126; and a microphone housing 226. Contacts 20 and SED 18 are shown integrated in a battery housing/charging base assembly 12c that fits between ear-piece housings 12a and 12b. Those skilled in the art will recognize many combinations of internal components, features, circuitry, battery options and the like for enabling both basic and advanced use of headset device 10 as a headset within the inventive ring-to-headset structure illustrated.

Battery supply in headset device 10 can be optimized by the dual mode identification contacts in the hinge assembly. For example, in closed (ring) mode, the battery is dedicated to the OLED screen driver and external speaker phone/microphone. In open (headset) mode, the battery powers DMA sound exciter and semiconductor microphones.

It will accordingly be understood that the disclosed embodiments are representative of presently preferred forms of the invention, but are intended to be enabling rather than limiting examples of the invention. Reasonable variation and modification are possible within the scope of the foregoing disclosure and drawings without departing from the spirit of the invention.

What is claimed:

1. An over-the-ear type wireless communications headset, comprising:
   an ear-piece and a voice-piece, the ear-piece and the voice-piece being connected for movement between a headset configuration adapted to be worn on a user's ear and a ring configuration adapted to be worn on a user's finger or thumb.

2. The headset of claim 1, wherein the headset is generally S-shaped in the headset configuration and generally circular in the ring configuration.

3. The headset of claim 1, wherein the ear-piece and voice-piece are movably connected for rotational movement relative to one another about an axis generally parallel to a plane corresponding to the ring configuration.

4. The headset of claim 3, wherein the ear-piece and voice-piece are movably connected at first ends by a swivel joint.

5. The headset of claim 4, wherein the swivel joint comprises a compression bias-loaded axial post rotatably connecting first ends of the ear-piece and the voice-piece, and mating male-female faces associated with the post on the first ends of the ear-piece and the voice-piece.

6. The headset of claim 3, whereint he ear-piece and voice-piece are releasably connected at second ends int he ring configuration by complementary angled clasp faces.

7. The headset of claim 6, wherein the complementary angled clasp faces include mating clasp means.

8. The headset of claim 6, wherein the mating clasp means comprise magnets.

9. The headset of claim 1, wherein the movement of the headset between the ring and headset configurations changes a function of the headset from a ring mode to a headset mode.

10. The headset of claim 9, wherein the ear-piece and voice-piece are movably connected at a joint that comprises mode-detecting contacts on the ear-piece and voice-piece, the mode-detecting contacts mating differently in the headset and ring configurations.

11. The headset of claim 1, wherein the headset further comprises at least one contact protruding from an inner circumference of one of the voice-piece and ear-piece when the headset is in the ring configuration, the contact operative to receive an electrical charge for an internal battery when the headset is in the ring configuration.

12. The headset of claim 11, wherein the contact is a compression contact adapted to yield inwardly in response to pressure from a finger-shaped object inserted through the headset in the ring configuration.

13. The headset of claim 12, further including in combination therewith a charger comprising a generally finger-shaped charging post adapted to fit through the headset in the ring configuration in the manner of a finger to make electrical charging connection with the compression contact.

14. The headset and charger combination of claim 13, wherein the charging post is upwardly-tapered, such that the compression contact is progressively compressed against the charging post as the headset is moved downwardly on the charging post.

15. The headset and charger combination of claim 13, wherein the charger further comprises a charging face generally perpendicular to the charging post and located adjacent a lower end of the post to receive a secondary charging contact on a side face of the headset in the ring configuration.

16. The headset of claim 11, further including in combination therewith a charger comprising a charging post adapted to fit through the headset in the ring configuration in the manner of a finger to make electrical charging connection with the contact.

17. The headset and charger combination of claim 16, wherein the charger further comprises a charging face generally perpendicular to the charging post and located adjacent a lower end of the post to receive a secondary charging contact on a side face of the headset in the ring configuration.

18. An over-the-ear communications headset for hands-free communication with mobile phones and similar devices, the headset being convertible to a ring configuration for wearing on a finger as a communications device or jewelry.

19. The headset of claim 18, wherein a function of the headset changes when the headset is converted to the ring configuration.

20. The headset of claim 18, wherein the headset comprises ear-piece and voice-piece halves that are connected to move between headset and ring configurations.

21. The headset of claim 20, wherein a function of the headset changes when the headset halves are moved between the headset and ring configurations.

* * * * *